（12）United States Patent
Starodubtsev

(10) Patent No.: US 9,266,286 B1
(45) Date of Patent: Feb. 23, 2016

(54) PEN FOR THREE-DIMENSIONAL PRINTING

(71) Applicant: CREOPOP PTE. LTD., The Central Singapore (SG)

(72) Inventor: Dmitry Starodubtsev, Tomsk (RU)

(73) Assignee: CREOPOP PTE. LTD., The Central Singapore (SG)

( * ) Notice: Subject to any disclaimer, the term of this patent is extended or adjusted under 35 U.S.C. 154(b) by 0 days.

(21) Appl. No.: 14/578,391

(22) Filed: Dec. 20, 2014

(51) Int. Cl.
*B29C 67/00* (2006.01)
*B33Y 30/00* (2015.01)

(52) U.S. Cl.
CPC ............ *B29C 67/0062* (2013.01); *B33Y 30/00* (2014.12)

(58) Field of Classification Search
CPC . B29C 67/0062; B29C 67/0066; B33Y 30/00
USPC .......................................................... 425/87
See application file for complete search history.

(56) References Cited

U.S. PATENT DOCUMENTS

| | | | | |
|---|---|---|---|---|
| 5,134,569 | A * | 7/1992 | Masters .................. | B29C 35/08 156/272.8 |
| 5,204,124 | A * | 4/1993 | Secretan ............. | B29C 67/0062 425/145 |
| 9,031,680 | B2 * | 5/2015 | Napadensky ....... | B29C 67/0059 264/401 |
| 9,102,099 | B1 * | 8/2015 | Karpas ................ | B29C 67/0085 |
| 2015/0048553 | A1 * | 2/2015 | Dietrich ............. | B29C 67/0055 264/401 |
| 2015/0314532 | A1 * | 11/2015 | Gordon ............... | B29C 67/0059 264/401 |

FOREIGN PATENT DOCUMENTS

| | | | | |
|---|---|---|---|---|
| CN | 103341975 | | 10/2013 | |
| CN | 203357906 | | 12/2013 | |
| CN | 203371791 | | 1/2014 | |
| CN | 203449607 | | 2/2014 | |
| CN | 103707511 | | 4/2014 | |
| CN | 104249596 | A * | 12/2014 | |
| CN | 204076852 | U * | 1/2015 | |
| CN | 204398330 | U * | 6/2015 | |
| FR | 2583333 | A1 * | 12/1986 | ............. B01J 19/121 |
| KR | WO 2014204020 | A1 * | 12/2014 | .......... B29C 35/0805 |

* cited by examiner

*Primary Examiner* — Robert B Davis
(74) *Attorney, Agent, or Firm* — TransPacific Law Group; Pavel I. Pogodin

(57) ABSTRACT

A 3D printing pen for extruding and curing a radiation-curable pasty polymer composition has a housing that contains a disposable cartridge filled with the composition. The cartridge also contains a piston that is slidable in the cartridge due to engagement of the nut secured in the piston with a lead screw that is located in the cartridge and driven from a motor so that displacement of the piston inside the cartridge expels the composition from the pen through an orifice at the end of the cartridge opposite the motor. The front end of the housing also contains LEDs that emit light onto the thread of composition on exit of the composition from the device. The mode of operation of the 3D printing pen and viscosity of the composition are selected so that after curing the extruded thread maintains its shape without supports.

20 Claims, 4 Drawing Sheets

PEN FOR THREE-DIMENSIONAL PRINTING

BACKGROUND OF THE INVENTION

1. Field of the Invention

The present invention relates to the field of three-dimensional printing (hereinafter referred to as "3D Printing") and, in particular, to a pen for three-dimensional printing (hereinafter referred to as "3D printing pen").

2. Description of the Related Art

A 3D printing pen is the latest innovative product that allows a 3D object to be drawn in space. A 3D pen can be used in many ways. Images or objects produced with a 3D pen can be created as flat forms that can be peeled from a piece of paper, as freestyle 3D objects, or as separate parts ready to be joined together. The creative opportunities are endless. In addition to manufacturing various ornamental designs, jewelry, etc., a 3D pen can be used for modeling, e.g., 3D prototyping.

Although 3D printing pens are relatively new products in the industry, some devices of this type are known in the art.

For example, Chinese Patent Application Publication CN103707511 (A) of Apr. 9, 2014 (inventor: Bao Huhe) describes a 3D printing pen that comprises a shell with an outlet nozzle on one end and a material-feeding opening on the other end. The material is fed through a feeding tube to the nozzle via an adjustable electric heater and is extruded through the orifice of the nozzle. In such a device the material can be supplied in the form of a viscous liquid (e.g., an oligomer) or in the form of solid matter. In the first case, the extruded material is cured when exiting the nozzle. In the second case the solid material melts by preheating and then returns to a pasty or solid state with the lapse of time after exiting the nozzle.

Chinese Utility Patent CN203449607 (U) of Feb. 26, 2014 (inventors: Haixiong, et al) describes a 3D printing pen that comprises a housing that contains a heating coil for heating a material which is fed through the feeding tube arranged along the housing and then extruded through the nozzle located on the side of the housing opposite the material inlet opening. The heating coil is located near the nozzle at the output end of the feeding tube. The device is provided with a sensor and a control circuit. The heating temperature is shown on a small display provided on the side of the housing.

Chinese Utility model CN203371791 (U) of Jan. 1, 2014 (inventor: Wenliang) discloses a 3D pen that comprises a printing pen body consisting of a shell and an internal hollow body, wherein the front end of the shell comprises a discharging nozzle and the rear end of the shell comprises a feeding port. The feeding port and the discharging nozzle are connected with a feeding channel arranged in the hollow body. The feeding channel is formed by connecting the feeding pipe at the tail part with the heating core at the front part. One end of the feeding pipe, which is close to the feeding port, is provided with a driving device in a linking manner. The driving device consists of a feeding control motor and a guiding wheel, which are linked. The space formed by the heating core and the shell is filled with insulated silica gel. A ventilating port is formed between the insulated silica gel and the shell in a blocking manner. The inner part of the hollow body also comprises a cooling fan, which communicates with the ventilating port. The 3D printing pen disclosed by the utility model has the advantage of a polymer material such as ABS (Acrylonitrile Butadiene Styrene), which is preheated or cooled to a certain temperature and continuously discharged. The temperature of the material is constantly adjusted and maintained at a required level.

Chinese Utility Patent CN203357906 of Dec. 25, 2013 (inventors: (Feizuo, et al) discloses a 3D printing pen that comprises a housing, an outlet head with a nozzle, a heating cavity, a drive motor, a material-feeding pipe, and a control panel with control buttons wherein the outlet head, the heating cavity, the drive motor, the material-feeding pipe, the control panel, and the control buttons are arranged in the housing. The outlet head is located at the front end of the housing. The heating cavity is arranged at the rear end of the outlet head. The control panel is provided with a control module, a power supply module, a heating module, and a motor module.

Chinese Patent Application Publication CN103341975 (A) of Oct. 9, 2013 (inventors: Feizuo, et al) discloses a 3D printing pen which in its structure and function is similar to one described in one of the aforementioned publications.

It can be seen that all known 3D printing pens are based on the use of a thermal process for softening and melting of the material to be extruded through the nozzle of the 3D printing pen. In case of a polymer. heating provides thermal curing, which is achieved by arranging a heater, such as an electric heater, inside the housing of the device.

SUMMARY OF THE INVENTION

The present invention relates to the field of D Printing and, in particular, to a pen for three-dimensional printing (hereinafter referred to as "3D printing pen").

A 3D printing pen of the present invention is intended for extruding and curing a radiation-curable pasty polymer composition. The 3D printing pen has a housing that contains a disposable cartridge filled with the aforementioned composition. The cartridge also contains a piston that is slidable in the cartridge due to engagement of the nut secured in the piston with a lead screw that is located in the cartridge and driven from a motor so that displacement of the piston inside the cartridge expels the composition from the pen through an orifice at the end of the cartridge opposite the motor.

The front end of the housing also contains LEDs that emit light onto the thread of composition on exit of the composition from the device. The mode of operation of the 3D printing pen and viscosity of the composition are selected so that after curing the extruded thread maintains its shape without supports. The total power of LEDs ranges from 1 to 5 W. The hollow housing is further provided with a protective cap which can be connected to the front end of the hollow housing. The tapered nozzle has an output orifice with a diameter ranging from 0.6 to 1.5 mm and n the LEDs irradiate a light with a wavelength in the range of 390 to 410 nm.

An example of the radiation-curable pasty substance suitable for the 3D printing pen of the present invention is a polymer composition comprises 60 to 80 mass % of oligoester acrylate, 10 to 30 mass % of liquid polyethylene glycol, 7 to 9 mass % of nonliquid polyethylene glycol, and 0.1 to 1 mass % of a system of photopolymerization initiators, and has viscosity measured at room temperature by the capillarity method in the range of 7.00 to 10.00 $mm^2/c$.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
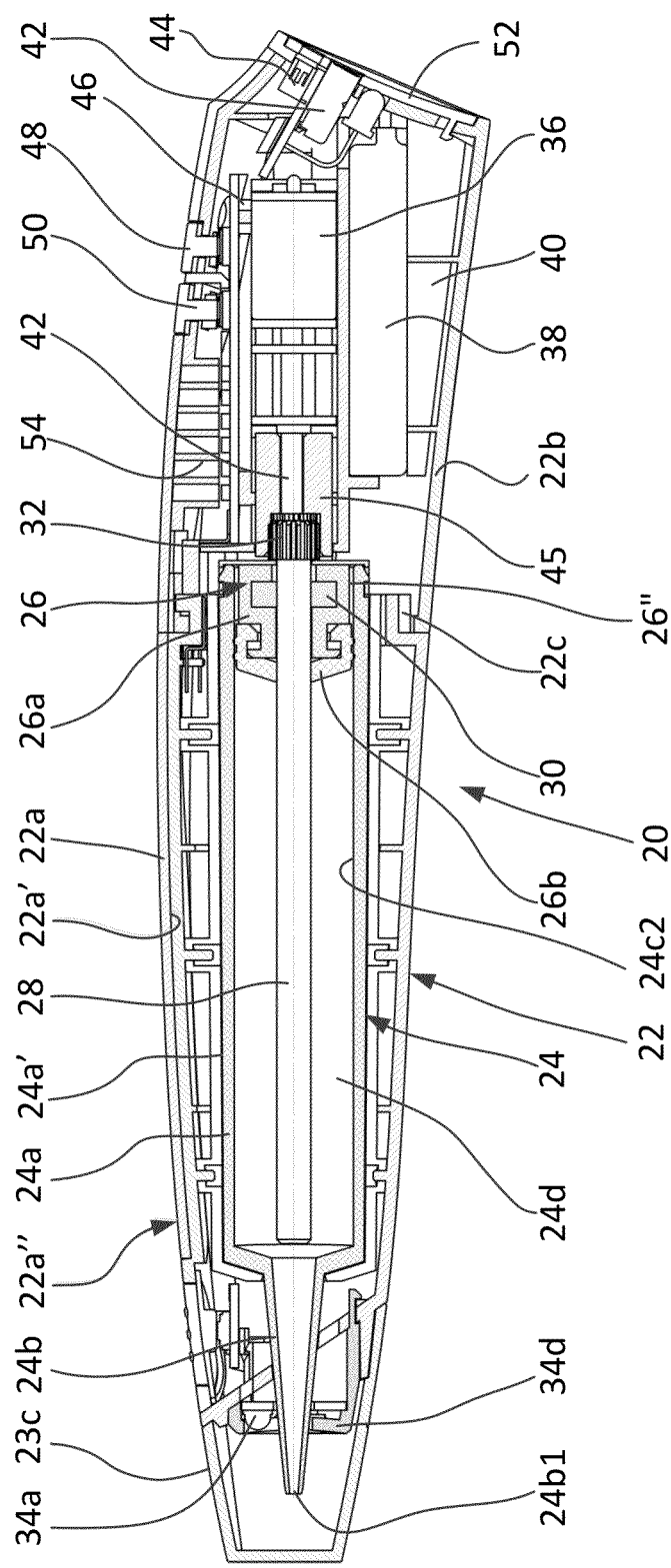
FIG. 1 is a longitudinal and sectional view of a 3D printing pen of the present invention.

FIG. 1 shows the 3D printing pen of the present invention (hereinafter referred to as "3D printing pen"), which as a whole is designated by reference numeral 20. Structurally, the 3D printing pen 20 comprises an elongated and hollowed housing 22 which has an inner surface 22a' and a front end 22a" and consists of two connectable/disconnectable parts 22a and 22b. The housing parts 22a and 22b are molded from a hard plastic material such as polycarbonate, polytetrafluoroethylene, hard polyethylene, etc. The parts may have a snap or bayonet connection 22c. In FIG. 1, reference numeral 22d designates a protective cap 23c, which can be connected, e.g., by snapping, to the tapered and open front end of the housing part 22a.

One of main components of the 3D printing pen is a prefilled and disposable cartridge 24, which is filled with a pasty material to be used for 3D printing. In the context of the present invention, the term "pasty" means a radiation-curable polymer composition that has kinematic viscosity, measured at room temperature by capillarity method, in the range of 7.00 to 10.00 $MM^2/c$. The measurements were conducted on a Viscosimeter VPZh-2, the product of Labtex, Moscow, Russia.

Figures 2A, 2B:
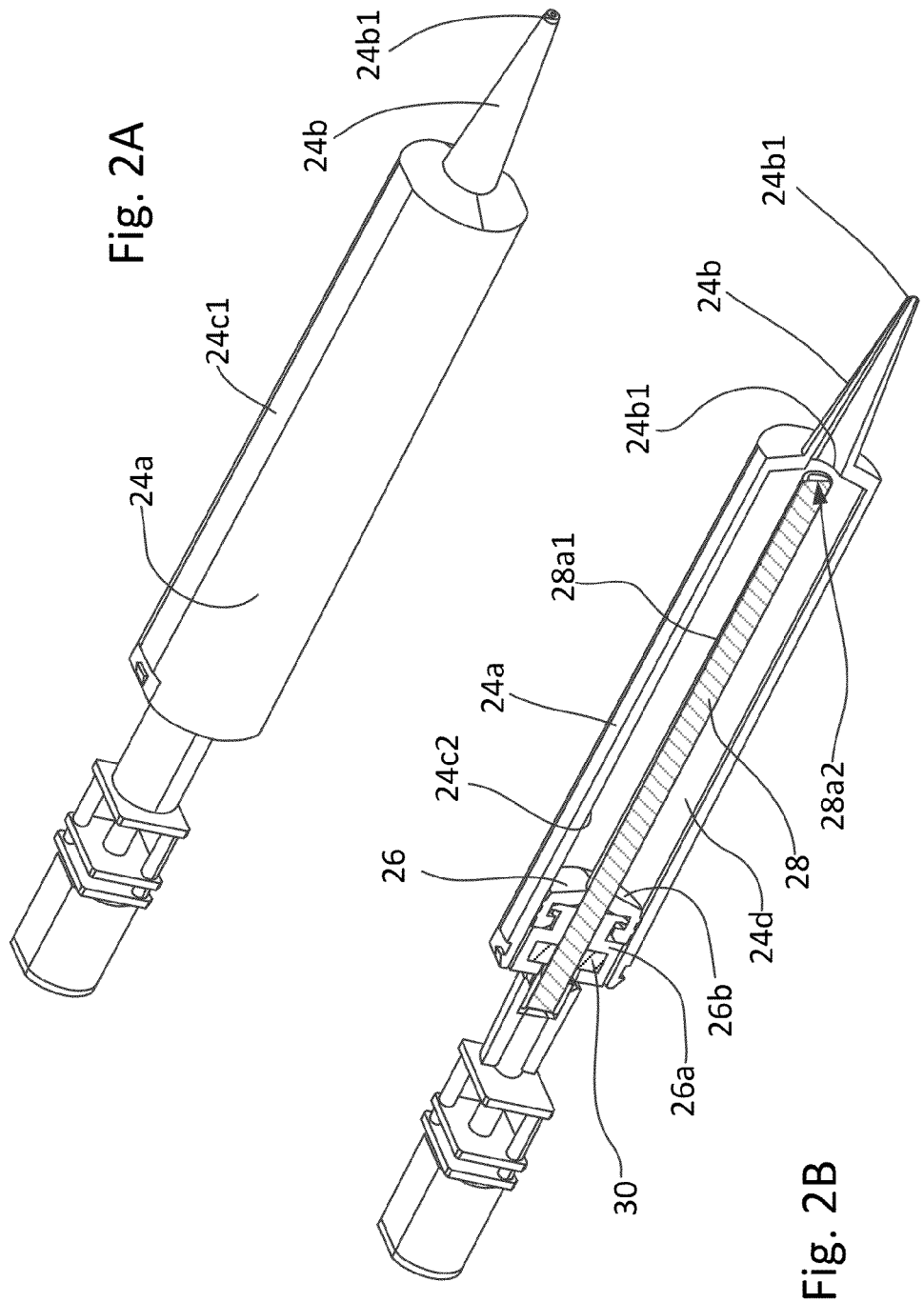
FIGS. 2A and 2B show a protective cover to be fitted on the nozzle side of the 3D printing pen in FIG. 1.

The cartridge casing is a single, hollow molded part having a cylindrical portion 24a with an open rear end and a tapered nozzle portion 24b at the front end. The disposable cartridge 24 is shown in FIGS. 2A and 2B, where FIG. 2A is a perspective external view of the cartridge 24, and FIG. 2B is a perspective, longitudinal and sectional view of the cartridge 24. As seen in FIGS. 2A and 2B, a part of the cylindrical wall of the part 24a has flats 24c1 and 24c2 on the outer surface of the cartridge and on the inner surface of the cartridge cavity, respectively. These flats extend along the entire length of the cylindrical part 24a of the cartridge 24. The purpose of the flat 24c1 is to prevent rotation of the cartridge inside the housing portion 22a when the cartridge is inserted into this portion of the housing through the rear open end of the latter. A mating flat 22a' is formed on the inner surface of the housing part 22a.

The rear open end of cylindrical portion 24a of the cartridge casing is closed and sealed by a piston unit 26 which consists of a piston 26a and a sealing element 26b made from a resilient chemically-resistant material such as rubber, plastic, or the like. The sealing element hermetically seals the interior 24d of the cylindrical part 24a, which contains the material to be used for extrusion through the nozzle part 24b.

The device has a means that prevents rotation of the piston 26 inside the cartridge in the form of a flat 24c2 on the inner surface of the container portion of the cartridge and a flat 26" on the outer surface of the piston 26.

Inserted into the piston 26a in a cantilever manner is a lead screw 28 which has a diameter smaller than the inner diameter of the cylindrical portion 24a in order to provide enough room for the material to be extruded, filling the space between the inner surface of the cylindrical portion 24a of the cartridge and the outer surface of the screw.

The piston 26a contains a nut 30 that is engaged with the thread 28a1 of the lead screw 28. Since the cartridge 24 is disposable and is intended for single use, the piston 26a, the screw 28, and the nut 30 can be molded from a plastic material, and the nut 30 can be embedded into the body of the piston 26a. The free end 28a2 of the lead screw 28 is located close to the inlet opening 24b1 of the nozzle 28b but does not close it.

The end of the screw 28 opposite to the nozzle 24b extends outside the end of the piston end of the part 24a of the cartridge and is provided with elements for connection with the screw-drive motor, which is described below. In the illustrated modification of the 3D printing pen, these connection elements are shown as splines 32 (FIG. 1).

The cartridge 24 is a disposable and interchangeable component of the 3D printing pen 20. In other words, the cartridge 24 can be selected to match specific 3D printing conditions by using cartridges with nozzles having different diameters of the outlet orifices and by filling the cartridge interior with different pasty materials. Based on the plurality of experiments, the inventors herein found that the best results in conjunction with the 3D printing pen of the invention for obtaining the extruded thread capable of maintaining its shape without the of supports are obtained when the cartridge is filled with a predetermined radiation-curable polymer composition, which constitutes the subject of parent pending patent application Ser. No. 14/536,729 filed on Nov. 10, 2014. Such a composition comprises 60 to 80 mass % of oligoester acrylate; 10 to 30 mass % of liquid polyethylene glycol; 7 to 9 mass % of nonliquid polyethylene glycol; and 0.1 to 1 mass % of a system of photopolymerization initiators. It is also preferable that such a composition be extruded at an environmental temperature of 22° C. and an extrusion rate of 2.5 to 3.5 cm/sec through the nozzle 24b (FIG. 1) having an output orifice with a diameter ranging from 0.6 to 1.5 mm, with irradiation before extrusion with light having a wavelength ranging from 390 to 410 nm emitted by LEDs 34a (FIG. 1), 34b (FIG. 3), and 34c (FIG. 4).

The radiation curable polymer composition has a kinematic viscosity measured at room temperature by capillarity method in the range of 7.00 to 10.00 $MM^2/c$. The measurements were conducted on the Viscosimeter VPZh-2, the product of Labtex, Moscow, Russia.

The determination of viscosity using a suitable capillary viscometer is carried out at a temperature of 20±0.1° C., unless otherwise prescribed. The time required for the level of the material to drop from one mark to the other is measured with a stopwatch to the nearest one-fifth of a second. The result is valid only if two consecutive readings do not differ by more than 1 percent. The average of no fewer than three readings gives the flow time of the material to be examined.

Calculate the dynamic viscosity $\eta$ (2.2.8) in millipascal seconds using this formula:

$$\eta = k\rho t$$

where:
k=constant of the viscometer, expressed in square millimeters per second squared,
ρ=density of composition to be examined expressed in milligrams per cubic millimeter, obtained by multiplying its relative density (d) by 0.9982,
t=flow time, in seconds, of the composition to be examined.

The constant k is determined using a suitable viscometer calibration liquid. The following formula is used to calculate the kinematic viscosity in mm²/s.

$$v=kt$$

Figure 3:
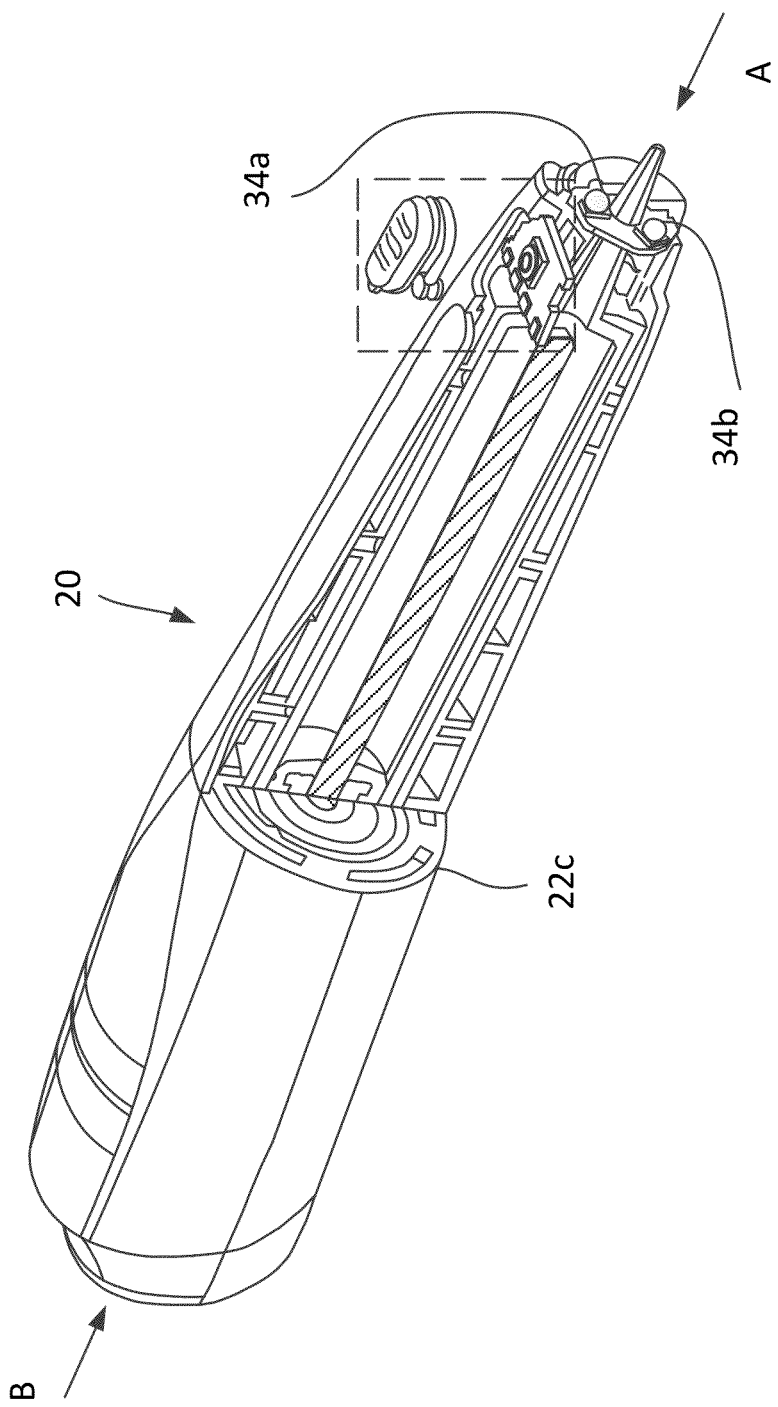
FIG. 3 is a perspective view of the 3D printing pen of the invention with a part removed to show the inner arrangement of the parts.
Figure 4:
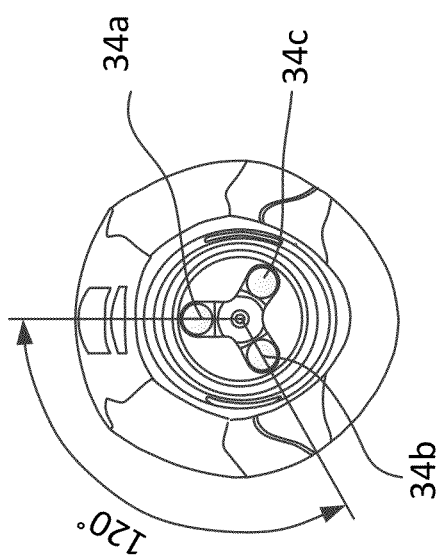
FIG. 4 is a front view of the 3D printing pen 20 in the direction of arrow A in FIG. 3.

FIG. 3 is a perspective view of the 3D printing pen 20 of the invention with a part removed for showing the inner arrangement of parts. FIG. 4 is a front view of the 3D printing pen 20 in the direction of arrow A in FIG. 3. The total power of the radiation energy emitting means, i.e., LEDs 34a, 34b, 34c, ranges from 1 to 5 W.

The LEDs are circumferentially arranged around the tapered nozzle inside the hollow housing at equal angular spaces, i.e., when three LEDs are used, they are spaced at an angle of 120°.

The tip 24b1 of the nozzle 24b protrudes beyond the outlines of the housing part 22a (FIG. 1) to a distance sufficient for observing the tip 24b1 by the user, and LEDs 34a, 34b, and 34c are supported by the LED holder 34d that forms the front wall of the housing part 22a. The LEDs are arranged so that the light beams (not shown) emitted by them are focused on the thread of the material extruded from the nozzle orifice at the most efficient point in curing the extruded thread.

Figure 5:
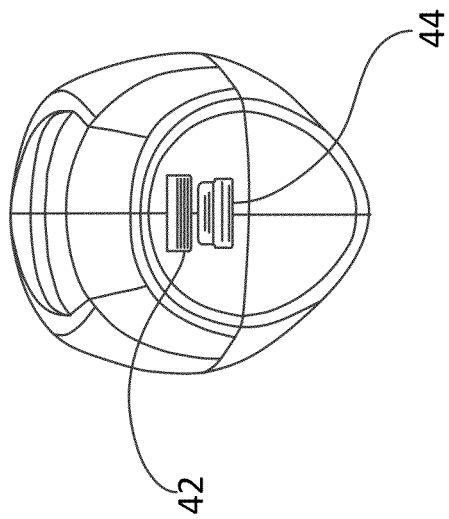
FIG. 5 is a view in the direction of arrow B in FIG. 3.

The rear housing part 22b contains a rotary drive motor, which comprises, e.g., a DC rotary motor 36 that is powered by a 12V battery cell 38 which is inserted into the hollow housing, conveniently located, e.g., in the battery compartment 40 formed inside the hollow housing part 22b. Alternatively, the drive power can be supplied to the motor from an external power supply source, e.g., through a mini USB 42 or an external control port 44 (shown in FIGS. 1 and 5), which is a view in the direction of arrow B of FIG. 3. The output shaft 42 of the motor 36 rigidly supports a coupling sleeve 44 which is provided with spline slits into which the splines 32 of the lead screw 28 are inserted for transmitting rotation of the motor 36 to the lead screw 28.

The rear housing part 22b also contains a control panel 46 that supports the switch On/Off button 48 and a speed switch button 50 (FIG. 1), the upper ends of which are exposed to the outer surface of the housing part 22b. The rear-end face of the housing part 22b is closed by an easily removable flat cover 52. The control panel also contains a control circuit (not shown) for controlling operation of the motor 36 and LEDs 34a, 34b, and 34c. Reference numeral 54 designates rigidity fins.

Thus, it has been shown that the 3D printing pen for extruding and curing a radiation-curable pasty polymer composition comprises the hollow housing 22, having an inner surface 22a' and a front end 22a"; the cartridge 24 having an outer surface 24a' and an inner surface 24a" and being filled with the radiation-curable pasty polymer composition, the cartridge 24 having a container portion 24a and a tapered nozzle 24b for extruding the curable pasty polymer material; the lead screw 28 rotationally supported inside the container portion 24a of the cartridge 24; the piston 26 with the nut 30 that is secured in the piston and engages the lead screw 28, the piston being slidingly fitted inside the container portion; the rotary drive unit in the form of a motor 36 kinematically connected to the lead screw for driving the lead screw into rotation; and the radiation energy emitting means in the form of LEDs 34a, 34b, and 34c located inside the housing around the tapered nozzle and emitting radiation energy onto the material extruded through the nozzle 24b of the cartridge for curing this material.

Although the invention is described with reference to specific examples of the 3D printing pen, it is understood to those skilled in the art that various modifications and changes are still possible without deviation from the scope of the appended patent claims. For example, two or more LEDs can be used for curing the extruded material. Radiation sources other than LEDs, e.g., laser diodes, can be used for the purposes of the invention. The chemical composition is given as an example only, and other compositions can be used, e.g., polymers with various additives such as coloring agents or nonpolymers suitable for other 3D printing conditions. The 3D printing pen 20 may be attached to the end effector of a computer-controlled robot or to a stationary control device. The hollow housing can be made from a light metal or a metal alloy.

What is claimed is:

1. A 3D printing pen for extruding and curing a radiation-curable pasty polymer composition comprising:
a hollow housing having an inner surface and a front end;
a cartridge having an outer surface and an inner surface and filled with the radiation-curable pasty polymer composition, the cartridge having a container portion and a tapered nozzle for extruding the curable pasty polymer material;
a lead screw rotationally supported inside the container portion of the cartridge, and a piston with a nut that is secured in the piston and engages the lead screw, the piston being slidingly fitted inside the container portion;
a rotary drive unit kinematically connected to the lead screw for driving the lead screw into rotation; and
radiation energy emitting means located inside the housing around the tapered nozzle and emitting radiation energy onto the material extruded from the nozzle of the cartridge for curing this material.

2. The 3D printing pen according to claim 1, wherein the radiation energy emitting means comprise a plurality of light-emitting diodes circumferentially arranged around the tapered nozzle inside the hollow housing.

3. The 3D printing pen according to claim 2, wherein the cartridge filled with the curable pasty polymer material is disposable.

4. The 3D printing pen according to claim 3, wherein the container portion of the cartridge has a first means that prevents rotation of the cartridge in the housing and a second means that prevents rotation of the piston inside the cartridge.

5. The 3D printing pen according to claim 4, wherein the first means comprises the first flat on the inner surface of the housing and a second flat on the outer surface of the container portion of the cartridge, and wherein the second means comprises a flat on the inner surface of the container portion of the cartridge and a flat on the outer surface of the piston.

6. The 3D printing pen according to claim 3, further comprising a power supply, the rotary drive unit being a direct current motor.

7. The 3D printing pen according to claim 6, wherein the power supply is selected from the group consisting of a battery cell insertable into the hollow housing and an external power supply source.

8. The 3D printing pen according to claim 1, wherein the total power of the radiation energy emitting means ranges from 1 to 5 W, the hollow housing being further provided with a protective cap which can be connected to the front end of the hollow housing.

9. The 3D printing pen according to claim 2, wherein the total power of the radiation energy emitting means ranges from 1 to 5 W, the hollow housing being further provided with a protective cap which can be connected to the front end of the hollow housing.

10. The 3D printing pen according to claim 4, wherein the total power of the radiation energy emitting means ranges from 1 to 5 W, the hollow housing being further provided with a protective cap which can be connected to the front end of the hollow housing.

11. The 3D printing pen according to claim 7, wherein the total power of the radiation energy emitting means ranges from 1 to 5 W, the hollow housing being further provided with a protective cap which can be connected to the front end of the hollow housing.

12. The 3D printing pen according to claim 1, wherein the tapered nozzle has an output orifice with a diameter ranging from 0.6 to 1.5 mm and wherein the radiation energy emitting means irradiate a light with a wavelength in the range of 390 to 410 nm.

13. The 3D printing pen according to claim 3, wherein the tapered nozzle has an output orifice with a diameter ranging from 0.6 to 1.5 mm and wherein the radiation energy emitting means irradiate a light with a wavelength ranging from 390 to 410 nm.

14. The 3D printing pen according to claim 5, wherein the tapered nozzle has an output orifice with a diameter in the range of 0.6 to 1.5 mm and wherein the light emitting diodes irradiate a light with a wavelength ranging from 390 to 410 nm.

15. The 3D printing pen according to claim 1, wherein the radiation-curable pasty polymer composition comprises 60 to 80 mass % of oligoester acrylate, 10 to 30 mass % of liquid polyethylene glycol, 7 to 9 mass % of nonliquid polyethylene glycol, and 0.1 to 1 mass % of a system of photopolymerization initiators, and has viscosity measured at room temperature by the capillarity method in the range of 7.00 to 10.00 $mm^2/c$.

16. The 3D printing pen according to claim 3, wherein the radiation-curable pasty polymer composition comprises 60 to 80 mass % of oligoester acrylate, 10 to 30 mass % of liquid polyethylene glycol, 7 to 9 mass % of nonliquid polyethylene glycol, and 0.1 to 1 mass % of a system of photopolymerization initiators, and has viscosity measured at room temperature by the capillarity method in the range of 7.00 to 10.00 $mm^2/c$.

17. The 3D printing pen according to claim 8, wherein the radiation-curable pasty polymer composition comprises 60 to 80 mass % of oligoester acrylate, 10 to 30 mass % of liquid polyethylene glycol, 7 to 9 mass % of nonliquid polyethylene glycol, and 0.1 to 1 mass % of a system of photopolymerization initiators, and has viscosity measured at room temperature by the capillarity method in the range of 7.00 to 10.00 $mm^2/c$.

18. The 3D printing pen according to claim 14, wherein the radiation-curable pasty polymer composition comprises 60 to 80 mass % of oligoester acrylate, 10 to 30 mass % of liquid polyethylene glycol, 7 to 9 mass % of nonliquid polyethylene glycol, and 0.1 to 1 mass % of a system of photopolymerization initiators, and has viscosity measured at room temperature by the capillarity method in the range of 7.00 to 10.00 $mm^2/c$.

19. The 3D printing pen according to claim 17, wherein the hollow housing contains a control panel that supports at least a switch On/Off button, a control circuit for controlling operation of the motor, and controls for adjusting power of the diodes.

20. The 3D printing pen according to claim 18, wherein the hollow housing contains a control panel that supports at least a switch On/Off button, a control circuit for controlling operation of the motor, and controls for adjusting power of the diodes.

* * * * *